United States Patent [19]

Nakamura et al.

[11] 4,029,000

[45] June 14, 1977

[54] INJECTION PUMP FOR INJECTING MOLTEN METAL

[75] Inventors: Hiromi Nakamura; Yosizo Komiyama, both of Numazu; Mitsuo Yamashita; Masaji Ishii, both of Tokyo, all of Japan

[73] Assignees: Toshiba Kikai Kabushiki Kaisha; Denki Kagaku Kogyo Kabushiki Kaisha, both of Tokyo, Japan

[22] Filed: June 12, 1975

[21] Appl. No.: 586,283

Related U.S. Application Data

[63] Continuation-in-part of Ser. No. 427,856, Dec. 26, 1973, abandoned.

[30] Foreign Application Priority Data

| | | |
|---|---|---|
| Dec. 28, 1972 | Japan | 48-2150 |
| Dec. 17, 1973 | Japan | 48-141609 |
| Dec. 17, 1973 | Japan | 48-141610 |
| Dec. 17, 1973 | Japan | 48-141611 |
| Dec. 17, 1973 | Japan | 48-141612 |
| Dec. 17, 1973 | Japan | 48-141613 |

[52] U.S. Cl. .................. 92/170; 92/248; 106/43; 106/73.3; 106/57

[51] Int. Cl.² .................. F01B 11/02; C04B 35/56; C04B 35/58

[58] Field of Search .................. 106/43, 57, 73.3; 92/248, 169, 170

[56] References Cited

UNITED STATES PATENTS

| | | | |
|---|---|---|---|
| 2,695,628 | 11/1954 | Wheildon | 106/43 |
| 3,093,087 | 6/1963 | Hansen | 417/DIG. 1 |
| 3,165,864 | 1/1965 | Shalze | 106/43 |
| 3,189,477 | 6/1965 | Shaffer | 106/43 |
| 3,296,002 | 1/1967 | Aau | 106/43 |
| 3,340,077 | 9/1967 | Alper et al. | 106/43 |
| 3,340,078 | 9/1967 | Alper et al. | 106/43 |
| 3,376,247 | 4/1968 | Reddy et al. | 106/43 |
| 3,433,471 | 3/1969 | Alper | 106/43 |
| R23,789 | 2/1954 | Montgomery | 106/43 |

*Primary Examiner*—Winston A. Douglas
*Assistant Examiner*—Mark Bell
*Attorney, Agent, or Firm*—Wenderoth, Lind & Ponack

[57] ABSTRACT

The cylinder and piston of an injection pump which are severely corroded by molten aluminum or the like are made of a composite sintered body containing two or more of the compounds selected from the group consisting of boron carbide, titanium diboride, zirconium diboride and boron nitride, and having excellent corrosion resistant, wear resistant and heat shock properties and high mechanical strength. One or more of the compounds selected from the group consisting of borides of tantalum, molybdenum and tungsten; carbides of silicon, zirconium, tantalum, vanadium,chromium, tungsten and molybdenum; nitrides of titanium, aluminum, silicon and zirconium; and oxides of aluminum and beryllium may be incorporated.

9 Claims, 2 Drawing Figures

INJECTION PUMP FOR INJECTING MOLTEN METAL

This is a continuation-in-part of application Ser. No. 427,856, filed Dec. 26, 1973, now abandoned.

BACKGROUND OF THE INVENTION

This invention relates to an injection pump utilized to inject molten metal such as aluminum, magnesium, zinc and alloys thereof into the mould of a hot or cold chamber type die cast machine.

For die casting zinc and zinc alloys which have relatively low melting points hot chamber type injection pumps have been used for the most part, whereas for die casting aluminum and alloys thereof cold chamber type die cast machines have generally been used because molten aluminum severely corrodes many types of metals. For this reason, ordinary steel cannot be used for the components of the injection pump which come to contact molten aluminum during operation.

Especially, the cylinder and piston or plunger of the injection pump are used under severe conditions in which they slide against each other at high speeds, high temperatures and under high pressures, so that it is important to construct these components with materials having excellent mechanical and chemical characteristics such as high temperature strength, high temperature hardness, thermal stability, corrosion resistant property, etc.

As is well known in the art, an injection pump for use in a die cast machine is immersed in a bath of molten metal for injecting the same into the mould. In the case of aluminum alloys, the temperature of the molten metal is maintained at a temperature of from 630° C to 700° C and the piston of the pump is moved at a speed of from 1 to 5 m/sec. to inject the molten metal under a pressure of from 100 to 300 $kg/cm^2$, for example.

The cylinder or the lining thereof and the piston of such injection pump have been made of ceramics because of their high corrosion resistance. In the past, it has been tried to use sintered bodies of $TiB_2$ as the ceramic but such trial has not succeeded commercially, because of their low mechanical strength, heat resistant property and low shock proofness.

SUMMARY OF THE INVENTION

It is an object of this invention to provide an improved injection pump durable against the corrosive action of molten metals, especially metals having low melting points.

Another object of this invention is to provide an injection pump having a cylinder or a lining thereof (hereinafter the term "cylinder" is used to include both of them) and a piston made of a special sintered body capable of resisting the corrosive effect of molten metals.

According to this invention there is provided an injection pump for injecting molten metals comprising a cylinder and a piston slidably received in the cylinder, characterized in that the cylinder and piston are made of a composite sintered body of a mixture of two or more of carbides, borides and nitrides.

Specific examples of the carbides, borides, and nitrides utilized in this invention are boron carbide $B_4C$, titanium diboride $TiB_2$, zirconium diboride $ZrB_2$ and boron nitride BN. It is advantageous to use a composite sintered body comprising two or more compounds selected from the group consisting of 10–90%, preferably 30–70% by weight of $B_4C$, 5–90% by weight of $TiB_2$, 5–90% by weight of $ZrB_2$ and 0.5–30% by weight of BN.

We have found that these composite sintered bodies have more advantageous characteristics than the sintered bodies of single metals. More particularly, the composite sintered bodies of $B_4C$ and $TiB_2$ or $ZrB_2$ have higher mechanical strength, toughness and wear resistant property than the sintered bodies of the respective compounds alone, although the hardness of these composite sintered bodies is lower than a sintered body of $B_4C$ alone but higher than that of a sintered body of $TiB_2$ or $ZrB_2$ alone. Although the reason for such advantageous characteristics is not yet clearly understood, it is considered that they are attributable to the improved bonding of the particles and a structure resulting in high strength.

As described above, since the composite sintered body contains a substantial amount of $B_4C$ it is possible to reduce diffusion of carbon from a graphite mould into the sintered body at the time of sintering, thereby preventing the formation of a brittle caburized layer. This also decreases the wear of the mould and increases dimensional accuracy of the sintered body.

When boron nitride is incorporated, the heat shock proofness of the sintered body can be improved. However, an excess quantity of boron nitride decreases hardness and mechanical strength as well as wear resistant property. However, it was found that a composite sintered body containing a relatively large quantity of boron nitride can be used in the injection pump for cold chamber type die cast machines.

DESCRIPTION OF THE PREFERRED EMBODIMENTS

Figure 1:
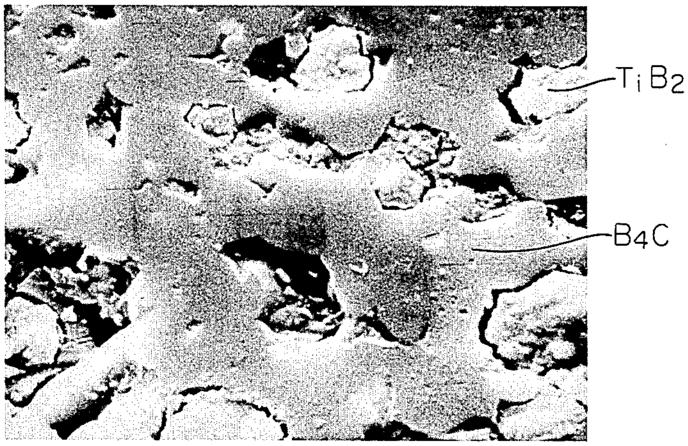
FIG. 1 shows a micrograph (magnified by 2600) of a sintered body consisting of $B_4C$, $TiB_2$ and BN photographed by a scanning type electron microscope.

In the following examples powders of the following materials were used as the raw materials for preparing the composite sintered bodies.

1. $B_4C$, a boron carbide powder sold by Denki Kagaku Kogyo Kabushiki Kaisha under the trade name of "Denkaboron No. 1200",
2. $TiB_2$, a powder of titanium diboride sold by Hermann Stark Co., vacuum grade,
3. $ZrB_2$, a powder of zirconium diboride sold by Hermann Stark Co., vacuum grade, and
4. BN, a powder of boron nitride sold by Denki Kagaku Kogyo Kabushiki Kaisha under the trade name of "Denka Boron Nitride GP".

The particle diameter of $B_4C$ was 2 to 6 microns, that of $TiB_2$ 5 to 15 microns, that of $ZrB_2$ 5 to 15 microns and that of BN 3 to 8 microns. Where particles having diameters differing greatly from these ranges are used, it is impossible to increase the density of the hot-pressed bodies to a desirable value necessary for producing dense sintered bodies.

In certain cases a small quantity of $Al_2O_3$, $SiO_2$or WC originated from a ball mill is contained in the powders of the raw materials but such impurities do not cause any serious trouble.

Although a definite amount of a compound, which is said to impart to the sintered body a satisfactory corrosion resistant property, such as borides of tantalum, molybdenum and tungsten; carbides of silicon, zirconium, tantalum, vanadium, chromium, tungsten and molybdenum; nitrides of titanium, aluminum, silicon and zirconium; and oxides of aluminum and beryllium, may be incorporated into a mixture of two or more of the compounds selected from the group consisting of $B_4C$, $TiB_2$, $ZrB_2$ and BN, it was found that such compounds act merely as weighting agents and do not contribute to the improvement of characteristics desired for injection pumps for injecting molten metal. For this reason, although not essential, incorporation of these corrosion resistant compounds into the composite sintered bodies of this invention may be permissible, provided that such compounds do not affect adversely the characteristics of the novel composite sintered body.

The method of preparing the novel composite sintered body of this invention is as follows:

Powders of $B_4C$, $TiB_2$, $ZrB_2$ and BN described above were admixed according to the formulations described in Examples 1 through 28 shown in the following Table 1.

Table 1

| Ex | Composition, (wt%) $B_4C$ | $TiB_2$ | $ZrB_2$ | BN | Porosity (%) | Bending Strength (kg/cm$^2$) | Hardness (Knoop) | Number of heat shock tests |
|---|---|---|---|---|---|---|---|---|
| 1 | 50 | 50 | — | — | 1.5 | 3350 | 2760 | 11 |
| 2 | 50 | — | 50 | — | 1.5 | 3450 | 2100 | 13 |
| 3 | 50 | 25 | 25 | — | 1.5 | 3250 | 2400 | 12 |
| 4 | 48.8 | 48.8 | — | 2.4 | 0.1 | 3300 | 2750 | 18 |
| 5 | 48.8 | — | 48.8 | 2.4 | 0.2 | 3100 | 2000 | 17 |
| 6 | 48.8 | 24.4 | 24.4 | 2.4 | 0.2 | 3200 | 3200 | 18 |
| 7 | 40 | 60 | — | — | 1.3 | 3000 | 2740 | 9 |
| 8 | 60 | — | 40 | — | 1.3 | 3550 | 2280 | 10 |
| 9 | 60 | 20 | 20 | — | 1.5 | 3200 | 2520 | 12 |
| 10 | 45 | 45 | — | 10 | 0.5 | 3100 | 2600 | >20 |
| 11 | 25 | — | 50 | 25 | 3.5 | 2400 | 1450 | >20 |
| 12 | 30 | 30 | 30 | 10 | 2.0 | 2700 | 2100 | >20 |
| 13 | 80 | 10 | 10 | — | 2.3 | 3400 | 3400 | 8 |
| 14 | 15 | 80 | 5 | — | 4.1 | 2700 | 2660 | 9 |
| 15 | 15 | 5 | 80 | — | 4.8 | 3100 | 1770 | 10 |
| 16 | 15 | 80 | — | 5 | 1.5 | 3000 | 2580 | >20 |
| 17 | 15 | — | 80 | 5 | 1.5 | 3100 | 1630 | >20 |
| 18 | 15 | 60 | — | 25 | 3.5 | 2400 | 2040 | >20 |
| 19 | 15 | — | 60 | 25 | 3.5 | 2400 | 1400 | >20 |
| 20 | 70 | 5 | — | 25 | 3.5 | 2600 | 1800 | >20 |
| 21 | 70 | — | 5 | 25 | 3.5 | 2600 | 2040 | >20 |
| 22 | 80 | 15 | — | 5 | 1.5 | 3000 | 2680 | >20 |
| 23 | 80 | — | 15 | 5 | 1.5 | 3000 | 2460 | >20 |
| 24 | — | 90 | — | 10 | 2.0 | 2600 | 2100 | >20 |
| 25 | — | — | 90 | 10 | 2.1 | 2400 | 1500 | >20 |
| 26 | — | 75 | — | 25 | 3.8 | 2300 | 1600 | >20 |
| 27 | — | — | 75 | 25 | 4.0 | 2100 | 1100 | >20 |
| 28 | — | 50 | 40 | 10 | 2.0 | 3000 | 1800 | >20 |

The powders of the raw materials were admixed at a dry state in a vibrating ball mill lined with a sheet of tungsten carbide. Then, ferrous contaminant originated from the ball mill was removed by a 10% aqueous solution of hydrochloric acid and the mixture was dried.

The mixture was then hot pressed or sintered in a graphite mould in an inert atmosphere or vacuum at a temperature of from 1700° C to 2300° C and under a pressure of from 100 to 300 kg/cm$^2$. With sintering temperatures less than 1700° C and pressures less than 100 kg/cm$^2$, the resulting sintered bodies do not have sufficient high density to be suitable for use in forming the injection pump. Use of sintering temperatures above 2300° C not only accompanies difficulty in elevating the temperature, but also results in reaction between the carbon of the graphite mould and the sintered body, thus increasing the difficulty in releasing the sintered body from the mould and decreasing the dimensional accuracy of the sintered body. It is difficult to construct moulds capable of withstanding moulding pressures exceeding 300 kg/cm$^2$ and such high moulding pressures often result in the fracture of the moulds.

After cooling the sintered body to room temperature, the surface thereof can be finished with a diamond grinding wheel.

We have prepared test pieces under various conditions and measured their bending strength, hardness, heat shock strength, reactivity with molten aluminum, and wear resistant property. We have also inspected their structure under an electron microscope, but the data shown in Table 1 were obtained under the same conditions for all test pieces, that is argon atmosphere, a sintering temperature of about 2000° C, a moulding pressure of about 200 kg/cm$^2$ and a sintering time of 30 minutes. The dimensions of the test pieces were; diameter 20 mm and length 25 mm. In Table 1, compositions, porosity, bending strength, hardness and number of heat shock tests of 28 examples of this invention are shown. In Table 2 below, data regarding the same characteristics of ten control examples are shown. In these Tables "the number of heat shock tests" were obtained in the following manner. A test piece was immersed for 10 minutes in a bath of molten aluminum maintained at a temperature of 680° C ± 10° C, and after removing the test piece from the bath, it was subjected to forced cooling with compressed air under a pressure of 4 kg/cm$^2$. This cycle was repeated until the test piece cracked, and the number of such cycles is indicated in the table. However, for the test pieces which did not crack at the end of the 20th cycle, the cycle was not further repeated.

Table 2

Control Example

| Ex | Composition, (wt%) $B_4C$ | $TiB_2$ | $ZrB_2$ | BN | Porosity (%) | Bending Strength (kg/cm$^2$) | Hardness (Knoop) | Number of heat shock tests |
|---|---|---|---|---|---|---|---|---|
| 1 | 100 | — | — | — | 2.2 | 3150 | 2800 | 2 |
| 2 | — | 100 | — | — | 4.5 | 1360 | 2700 | 4 |
| 3 | — | — | 100 | — | 6.1 | 2080 | 1510 | 5 |
| 4 | 5 | 85 | 10 | — | 5.1 | 2200 | 2950 | 3 |
| 5 | 5 | 10 | 85 | — | 5.1 | 3100 | 1710 | 4 |
| 6 | 5 | 55 | 40 | — | 5.2 | 2200 | 2240 | 4 |
| 7 | 10 | 55 | — | 35 | 7.2 | 1200 | * | >20 |
| 8 | 40 | — | 25 | 35 | 7.5 | 1200 | * | >20 |
| 9 | 55 | — | 10 | 35 | 7.2 | 1200 | * | >20 |
| 10 | — | 65 | — | 35 | 7.5 | 1200 | * | >20 |

*Too soft so that it was impossible to measure their hardness by the Knoop method.

By comparing Tables 1 and 2 it can be noted that control examples show larger porosity than the examples of the invention, and that control examples 1 to 6 show lower heat shock resistance than the examples of this invention. Although control examples 7, 8, 9 and 10 showed comparable heat shock resistance their hardness is too low for use in injection pumps.

Figure 2:
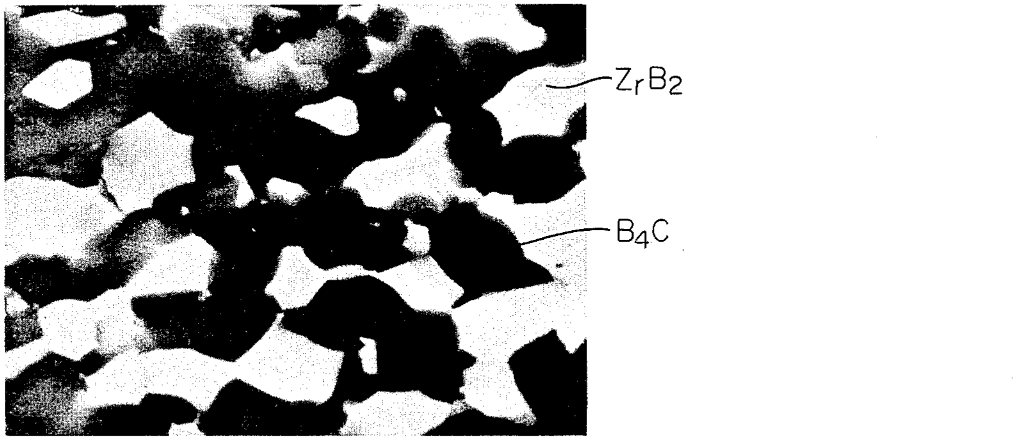
FIG. 2 shows a similar micrograph of a sintered body consisting of $B_4C$, $ZrB_2$ and BN.

FIG. 1 shows a micrograph (magnified by 2600) taken by a scanning electron microscope showing the structure of the composite sintered body of Example 4, and FIG. 2 shows a similar micrograph of Example 5. In FIG. 1 the continuous smooth phase shows $B_4C$, and the island-like phase scattered in the $B_4C$ phase shows $TiB_2$. In FIG. 2 the black phase shows $B_4C$, and the white phase shows $ZrB_2$. In both examples, since the content of BN was only 2.4, particles of BN are not shown. It is believed that particles of BN were removed when polishing the specimens.

Composite sintered bodies having the following compositions were found suitable to attain the object of this invention, the percentages being weight %.

a. $B_4C$ 10 – 90%, balance $TiB_2$ or $ZrB_2$.

b. $B_4C$ 10 – 90%, $TiB_2$ 5 – 90%, $ZrB_2$ 5 – 90%.

c. $B_4C$ 10 – 90%, BN 0.5 – 30%, balance $TiB_2$ or $ZrB_2$.

d. $B_4C$ 10 – 90%, BN 0.5 – 30%, $TiB_2$ 5 – 90%, $ZrB_2$ 5 – 90%.

e. BN 0.5 – 30%, balance $TiB_2$ or $ZrB_2$.

f. BN 0.5 – 30%, $TiB_2$ 5 – 90%, $ZrB_2$ 5 – 90%

Composite sintered bodies having compositions other than those specified above are not suitable because of their inferior heat shock resistant property, wear resistant property, mechanical strength and stiffness.

To compositions a through f described above were added the above discussed corrosion resistant compounds, and the following Table 3 shows the compositions of the resulting sintered bodies, their porosity, bending strength, hardness and number of heat shock tests. By comparing Table 1 with Table 3 it will be noted that it is possible to obtain composite sintered bodies having desirable characteristics suitable for use as the component parts of injection pumps when the corrosion resistant compounds are added in an amount of less than 30% by weight.

Table 3

| | Compositions, (wt%) | | | | | | | | | Porosity | Bending Strength | Hardness | Number of heat shock |
|---|---|---|---|---|---|---|---|---|---|---|---|---|---|
| Ex | $B_4C$ | $TiB_2$ | $ZrB_2$ | BN | ZrC | TiN | SiC | $TaB_2$ | $Al_2O_3$ | (%) | ($kg/cm^2$) | (Knoop) | tests |
| 29 | 44.8 | 44.8 | — | 9.9 | 0.5 | — | — | — | — | 0.6 | 3000 | 2500 | >20 |
| 30 | 42.8 | 42.8 | — | 9.4 | 5 | — | — | — | — | 0.6 | 3000 | 2300 | >20 |
| 31 | 33.8 | 33.8 | — | 7.4 | 25 | — | — | — | — | 0.4 | 3300 | 2000 | >20 |
| 32 | 14.7 | 78.4 | — | 4.9 | 2 | — | — | — | — | 1.7 | 3000 | 2400 | >20 |
| 33 | 14.7 | — | 58.8 | 24.5 | — | 2 | — | — | — | 3.4 | 2300 | 2000 | >20 |
| 34 | 14 | — | 55.8 | 23.7 | — | 7 | — | — | — | 3.7 | 2200 | 1950 | >20 |
| 35 | 78.4 | 14.7 | — | 4.9 | — | 2 | — | — | — | 1.5 | 3100 | 2500 | >20 |
| 36 | 78.4 | 14.7 | — | 4.9 | — | — | 2 | — | — | 1.2 | 3300 | 2600 | >20 |
| 37 | — | 85.5 | — | 9.5 | 5 | — | — | — | — | 1.8 | 2700 | 2000 | >20 |
| 38 | — | — | 66.5 | 23.5 | 10 | — | — | — | — | 3.0 | 2500 | 1500 | >20 |
| 39 | — | 45 | 36 | 9 | — | — | 5 | — | — | 1.5 | 3200 | 1800 | 20 |
| 40 | 47.5 | 47.5 | — | — | — | — | 5 | — | — | 0.9 | 3500 | 2700 | 11 |
| 41 | 45 | 23.5 | 23.5 | — | — | — | 10 | — | — | 0.6 | 3400 | 2300 | 12 |
| 42 | 13.5 | 72 | 4.5 | — | — | — | 10 | — | — | 1.5 | 3500 | 2700 | 9 |
| 43 | 57 | — | 38 | — | — | — | 5 | — | — | 0.7 | 3700 | 2400 | 10 |
| 44 | 46.4 | 23.2 | 23.2 | 2.2 | 5 | — | — | — | — | 0.1 | 3500 | 3100 | 18 |
| 45 | — | 45 | 36 | 9 | — | — | — | 5 | — | 1.0 | 3200 | 1800 | >20 |
| 46 | 45 | 23.5 | 23.5 | — | — | — | — | 10 | — | 0.8 | 3500 | 2300 | 12 |
| 47 | 42.8 | 42.8 | — | 9.4 | — | — | — | — | 5 | 2.7 | 3000 | 2200 | >20 |
| 48 | 14.7 | 78.4 | — | 4.9 | — | — | — | — | 2 | 1.9 | 3000 | 2300 | >20 |

Each of the composite sintered bodies of examples 1 through 48 was used to manufacture the cylinder and piston of injection pumps, and the operating life of the pumps was tested. In some cases, the main body of the pump, usually made of cast iron and coated with a protected coating of graphite, was corroded by molten metal at the end of 110,000 to 160,000 injection operations under a pressure of 150 – 250 $kg/cm^2$. However, even after such a number of operations no evidence of corrosion of the cylinder and piston was noted. The molten metal used in these tests was an aluminum alloy having a composition consisting of Cu 1.5 – 3.5%, Si 10.5 – 12.0%, Mg 0.3%, Zn 1.0%, Fe 0.9%, Mn 0.5%, Ni 0.5%, Si 0.3% and the balance of aluminum. From the foregoing description it will be noted that the invention provides an injection pump adapted for use to inject molten zinc, magnesium and alloys thereof, wherein the cylinder and the piston of the cylinder are made of a composite sintered body which is easy to prepare and which has high corrosion resistant, heat shock resistant and wear resistant properties as well as large mechanical strength.

We claim:

1. In an injection pump including a cylinder and a piston slidably received in said cylinder for injecting molten metal, the improvement wherein at least one of said cylinder and said piston are made of a composite sintered body consisting essentially of a mixture of 10–90% by weight of boron carbide and at least one compound selected from the group consisting of 5–90% by weight of titanium diboride, 5–90% by weight of zirconium diboride and 0.5–30% by weight of boron nitride.

2. The improved injection pump of claim 1 wherein the composite sintered body is a mixture of 10–90% by weight of boron carbide and 5–90% by weight of titanium diboride.

3. The improved injection pump of claim 1 wherein the composite sintered body is a mixture of 10–90% by weight of boron carbide and 5–90% by weight of zirconium diboride.

4. The improved injection pump of claim 2 wherein said mixture further contains 5–90% by weight of zirconium diboride.

5. The improved injection pump according to claim 2 wherein said mixture further contains 0.5% to 30% of boron nitride.

6. The improved injection pump according to claim 3 which further contains 0.5% to 30% by weight of boron nitride.

7. The improved injection pump according to claim 4 wherein said mixture further contains 0.5% to 30% by weight of boron nitride.

8. The improved injection pump according to claim 3, wherein said composite sintered body consists of less than 30% by weight of at least one compound selected from the group consisting of borides of tantalum, molybdenum and tungsten; carbides of zirconium, silicon, tantalum, vanadium, chromium, tungsten, and molybdenum; nitrides of aluminum, silicon, titanium and zirconium; and oxides of aluminum and beryllium.

9. The improved injection pump according to claim 3 wherein said composite sintered body further comprises less than 30% by weight of at least one compound selected from the group consisting of borides of tantalum, molybdenum and tungsten; carbides of zirconium, silicon, tantalum, vanadium, chromium, tungsten, and molybdenum; nitrides of aluminum, silicon, titanium and zirconium; and oxides of aluminum and beryllium.

* * * * *